Sept. 26, 1967  T. W. MARTINEK  3,343,220
APPARATUS FOR CORRUGATING AND COMPRESSING
A TUBULAR MATERIAL
Filed July 24, 1964  3 Sheets-Sheet 1

INVENTOR.
THOMAS W. MARTINEK
BY
ATTORNEY.

Sept. 26, 1967 T. W. MARTINEK 3,343,220
APPARATUS FOR CORRUGATING AND COMPRESSING
A TUBULAR MATERIAL
Filed July 24, 1964 3 Sheets-Sheet 2

INVENTOR.
THOMAS W. MARTINEK
BY *Edward H. Lang*

ATTORNEY.

INVENTOR.
THOMAS W. MARTINEK
BY Edward H. Lang
ATTORNEY.

United States Patent Office 3,343,220
Patented Sept. 26, 1967

3,343,220
APPARATUS FOR CORRUGATING AND
COMPRESSING A TUBULAR MATERIAL
Thomas W. Martinek, Crystal Lake, Ill., assignor, by mesne assignments, to Union Oil Company of California, Los Angeles, Calif., a corporation of California
Filed July 24, 1964, Ser. No. 384,974
13 Claims. (Cl. 18—19)

This invention is directed to a means and method of suspending and/or oscillating a member in space by magnetic and electro-magnetic forces.

This invention also relates to the art of performing operations on and treating the walls of flexible continuous tubing. More particularly, this invention relates to an apparatus and a method wherein flexible tubing is corrugated and compressed in one operation. The invention is shown as applied to extruded plastic tubing in which the tubing is corrugated or shirred and compressed in one apparatus. However, the invention is not to be limited to a shirring operation nor is it to be limited to operations performed on plastic tubing. For instance, rather than corrugating or shirring, the tubing could be imprinted, perforated, embossed, etc. This invention is applicable to other types of tubing such as is used in the sausage casing industry wherein the tubing is referred to as a casing and is usually made from the intestinal linings of animals. Throughout this specification the term "tubing" shall be taken to mean edible and inedible synthetic and naturally occurring organic material from which sausage casings can be formed as well as tubing used for other purposes.

The sausage industry has in recent years utilized inedible synthetic casings in which to prepare sausage meats. The development of the synthetic continuous casing has made it necessary to resort to some means of compacting the extruded casing so that filling, storage and/or transit of the casing could be facilitated. In developing a technique which would ease the handling, filling and storage of the extruded casing the sausage industry has resorted to corrugating the casing and then thereafter compacting or compressing the tubing into easily stored packages and have thus been successful in easing storage, handling and transportation problems. However, in corrugating the casings the present state of the art requires specialty gears working around a mandrel and against air pressure to pleat or corrugate the casing and thereafter compressing the pleated tubing in a separate operation so that the compressed casing occupies much less space than it would if the casing had not been pleated and compressed. This method while practical has not proved to be entirely satisfactory. Perforation or puncture of the casings caused by the specialty gears working around the mandrels has resulted in a great monetary loss to the casing manufacturers and meat packers. Of course, if the casing is ruptured the sausage meat cannot be blown or stuffed into the punctured casings and this problem has necessitated work stoppage in the filling of the sausage casing to either repair or cut out the damaged portion of the casing used in the continuous sausage meat filling apparatus. It has been estimated that many thousands of dollars have been lost annually due to the inadvertent puncturing of the casings as they are being corrugated and the resultant work stoppage that occurs when the punctured portion of the casing is fed into the sausage meat filling machine. This invention therefore provides an apparatus and method which is substantially superior to the prior art apparatus and method used in the industry for pleating, corrugating or otherwise performing operations on flexible tubing and the like.

An object of this invention is to provide a method and means for suspending and/or controlling the movement of a visibly unsupported object in space.

An object of this invention is to provide an efficient, quick and economical method and apparatus for corrugating, pleating, embossing, imprinting and otherwise performing operations on the walls of flexible, substantially non-elastic tubing.

Another object of this invention is to provide a method and apparatus whereby the thin walls of substantially non-elastic flexible tubing are shirred and compressed simultaneously.

Yet another object of this invention is to provide an apparatus which is relatively inexpensive and easily maintained for the corrugation and compact packaging of sausage casing with little or no wastage.

These and other objects will be readily apparent from the following description and drawings in which.

The invention will be more readily understood by reference to the accompanying drawings in which like numerals of reference designate corresponding components in each of the several figures.

Figure 1A:
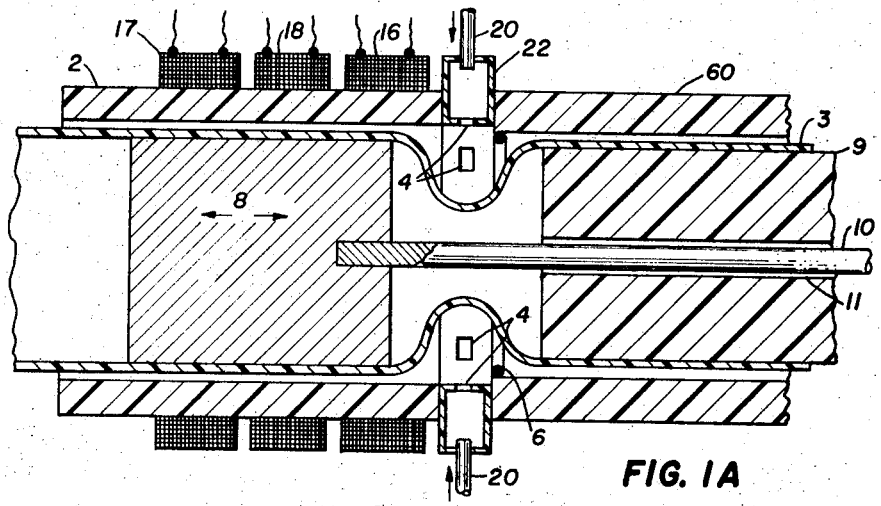
FIGURES 1A and 1B are cross-sectional views illustrating the operation and use of the device of FIGURE 1.
Figure 1B:
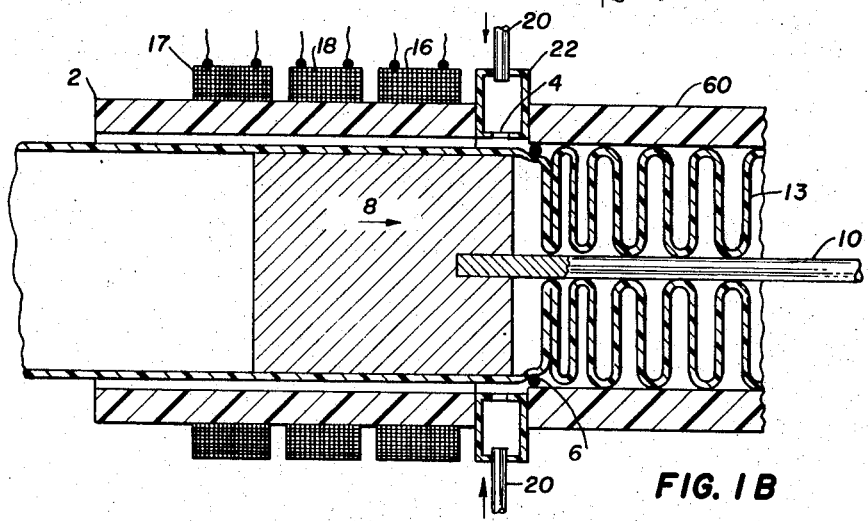
Figure 1:
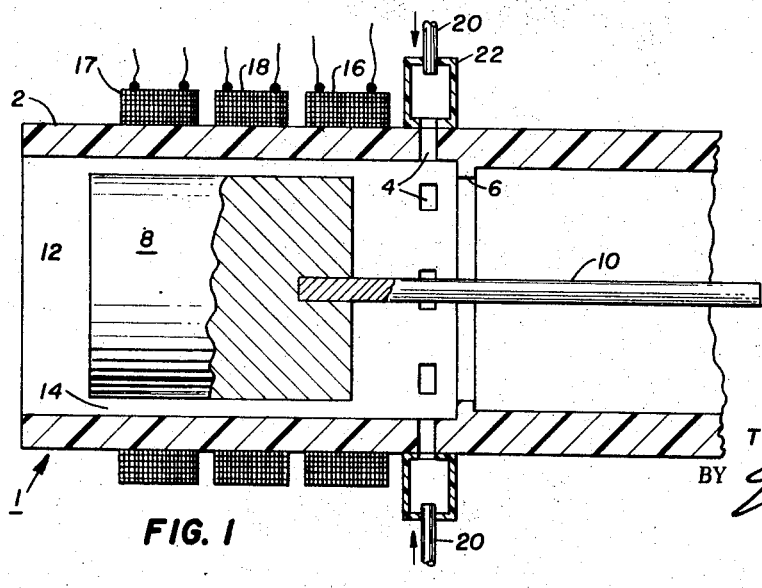
FIGURE 1 is a side elevation, cross-sectional view illustrating one device that may be employed in accordance with the present invention.

Referring to FIGURE 1, the numeral 1 represents an electromagnetically operated tubing corrugator. A guide means 2, depicted here as an annular, hollow, elongated conduit, is fashioned from a non-magnetic material such as brass, aluminum or plastic and is of a diameter sufficient in size to allow the free passage of the flexible tubing to be pleated or shirred therethrough. For example, if the flexible tubing has a normal diameter of 1 inch, the interior diameter of the conduit can be about 1.005–1.100 inches. The wall thickness of the guide means 2 is preferably small, say less than 0.125" so that the generation of magnetic flux adjacent the interior wall may be efficiently utilized. A series of apertures 4 are spaced circumferentially around guide means 2. The number and size of the apertures 4 may be such that a continuous slit is formed. The internal diameter of the guide means 2 posterior to apertures 4 is of slightly lesser diameter than the anterior portion of the guide means such that frictional forces will act upon the flexible tubing beginning at projections 6 of the posterior portion of guide means 2. Ferromagnetic hammer 8 is positioned within guide means 2 and is fashioned of ferrites or a metal such as iron, steel, cobalt, nickel, an iron-nickel alloy composed of 80% nickel and 20% iron or an iron-aluminum-cobalt alloy marketed under the trade name "Alnico." Secured to the posterior surface of hammer 8 is a second guide means 10 which extends into the posterior passage formed by guide means 2. Guide means 10 is preferably a non-magnetic material and preferably is substantially coextensive with the posterior portion of guide means 2. Guide means 10 may be either an integral part of hammer 8 or may be a shaft inserted in hammer 8 in such a manner that hammer 8 is free to move laterally on shaft 10 within certain limits, thus making oscillatory motion of guide shaft 10 unnecessary. Hammer 8 is freely movable within passageway 12 and is of smaller cross-section than guide means 2 in order to provide an annular passageway 14. A plurality of wire windings forming central coil 18 are disposed on the exterior surface of guide means 2 circumferentially encompassing hammer 8. The magnetic force of central coil 18 when energized is sufficient to cause hammer 8 to assume a position in the middle of the anterior region of guide means 2. Wire windings comprising coils 16 and 17 disposed on both sides of coil 18, upon alternate energization and de-energization, cause hammer 8 to oscillate in an axial manner from apertures 4. Conduit 20 supplies air or other inert gas under pressure to chamber 22 where the gas is ejected through apertures 4 against the exterior surface of the tubing. Air or gas chamber 22 is preferably fashioned of non-magnetic material so as not to impose attractive or repulsive forces upon hammer 8.

The operation of the device of FIGURE 1 is best described by reference to FIGURES 1A and 1B. For simplicity the guide means here is shown as comprising anterior section 2 and posterior section 60, having an interior diameter slightly less than the interior diameter of member 2. As an alternative embodiment projection 6 is shown as a friction fit ring insert within member 60 for reasons which will hereinafter become apparent. Chambers 22 and guide means 2 and 60 are secured in place by means not shown. Referring to FIGURE 1A, hammer 8 is mounted in starting block 9 with guide means 10 fitted into bearing surface 11 machined in block 9. Flexible tubing 3 is slipped over hammer 8 and stretched over the surface of block 9 so that hammer 8 is free to move with respect to tubing 3 but the block 9 is not free to so move. The assembly hammer 8, block 9 and tubing 3 is inserted into the device of FIGURE 1 so that block 9 is friction fit to the posterior region. Coil 17 is energized pulling hammer 8 back to the position illustrated in FIGURE 1A. Inert gas is admitted under pressure to chamber 22 where it is ejected at high velocity against the flexible tubing 3, causing the tubing to be depressed in the region of the apertures 4 as shown in FIGURE 1A. Coils 16 and 17 are alternately energized and de-energized causing hammer 8 to compress the depressed region of tubing 3 and advance the pleated and compressed tubing into the posterior region ejecting the starting block 9 from the posterior region.

Referring to FIGURE 1B, the relative positions of the cooperating parts during a compression cycle are shown. It may be seen that the hammer 8 has moved the depressed tube section well into the posterior region forming a series of compressed folds 13 within the friction fit guide 60 forming a section of shirred tubing having exact dimensions. Activation of coil 17 causes the hammer 8 to return to the position illustrated in FIGURE 1A. The shirred and compressed tubing remains in position because of the projection 6 and the friction between guide 60 and the tubing folds. The air jet causes collapse of the tubing and alternate activation of coils 16 and 17 causes repetition of the cycle.

Figure 2:
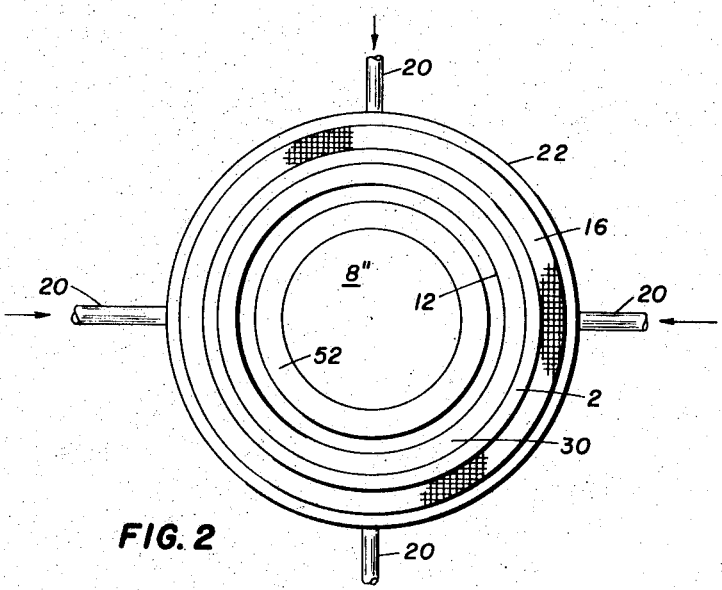
FIGURE 2 is a front view of a further modification of an alternate embodiment of this invention on line 2—2 of FIGURE 3.
Figure 3:
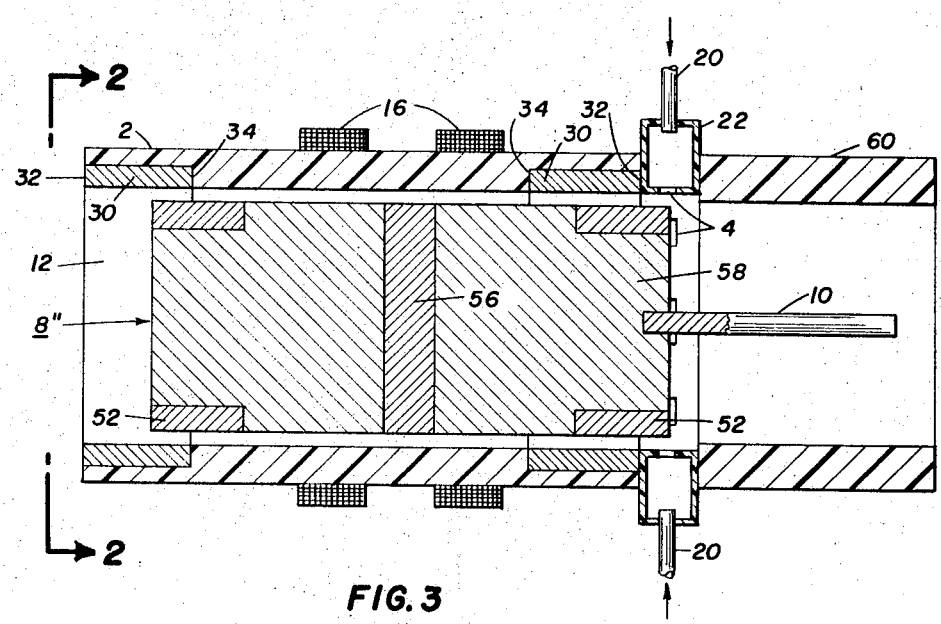
FIGURE 3 is a side elevation, cross-sectional view of the apparatus illustrated in FIGURE 2.

Referring to FIGURES 2 and 3, guide 2 fashioned of non-magnetic material has recessed within its interior wall thereof two permanet magnets 30 with the magnetic lines of force extending from surface 32 to surface 34. The polarity of surfaces 34 are identical, creating repulsive lines of magnetic force between annular magnets 30. Hammer 8″ comprises permanent annular magnets 52 at the extreme ends of hammer 8″ with ferrite disc 56 comprising the center portion of hammer 8″ and being separated from permanent magnets 52 by non-magnetic material 58. Shaft 10 is fastened to the posterior face of hammer 8″ by, for example, spot welds or brazing and extends into second guide member 60 fashioned from non-magnetic material. In this embodiment the lines of force between the permanent magnets 30 comprising part of the guide 2 and the lines of force of the permanent magnets 52 comprising hammer 8″ are equal and opposite and coact to suspend hammer 8″ within guide 2. The magnetic properties of these novel magnets as well as their mode of manufacture are described in U.S. Patent 2,828,264, incorporated herein by reference. The energization and de-energization of windings 16 create magnetic forces acting upon ferrite disc 56 causing hammer 8″ to oscillate in an axial manner between apertures 4 of air chamber 22 and the anterior portion of passage 12 formed by guide means 2. Members 2, 22, and 60 are secured to each other by conventional means not shown, to prohibit relative movement between members.

Figure 4:
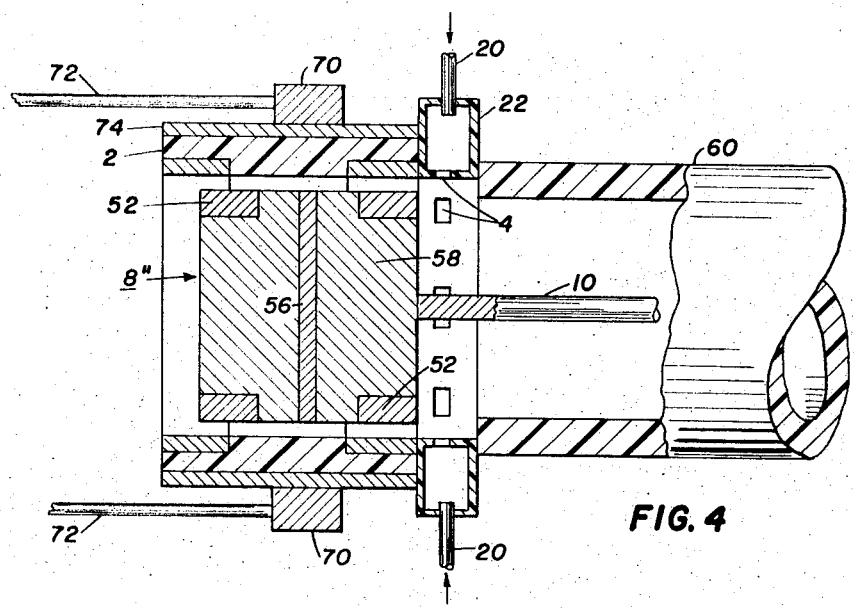
FIGURE 4 is a side elevation, cross-sectional view of another embodiment of the apparatus of this invention.

FIGURE 4 illustrates an alternative embodiment of the apparatus depicted in FIGURE 3 wherein wire windings 16 are replaced by slidable permanent magnets 70 which are disposed on the outer surface of guide 2 which upon movement of rod 72 causes permanent magnets 70 to slide on the exterior surface of guide 2 by means of lubricated bearings 74 which movement imposes magnetic forces upon ferrite disc 56 causing hammer 8″ to oscillate in unison with the movement of magnets 70.

Figure 5:
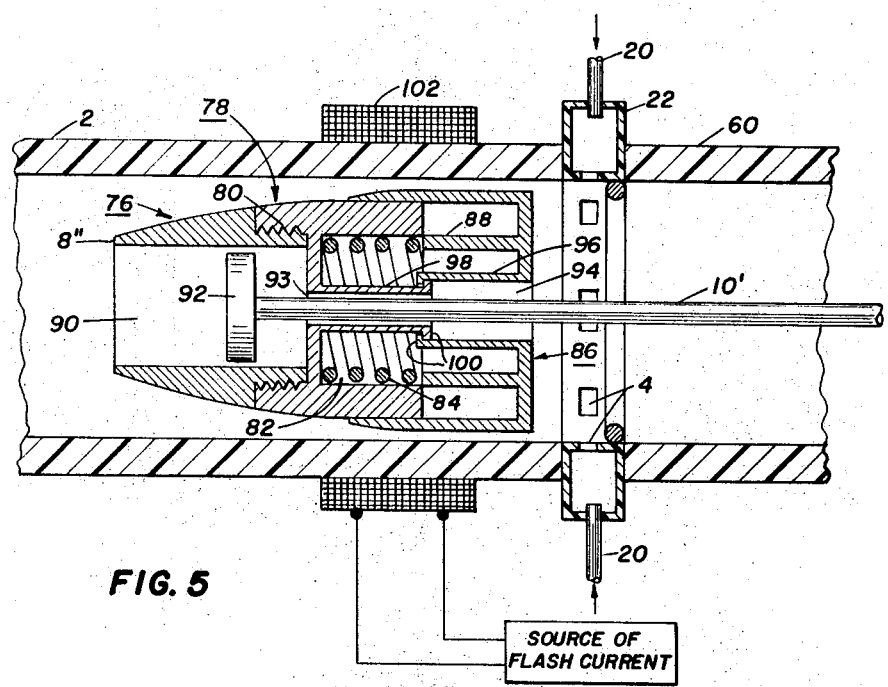
FIGURE 5 is a side elevation, cross-sectional view of still another embodiment of the apparatus.

Referring to FIGURE 5, there is depicted an apparatus which uses only one coil for activation of the oscillation cycle wherein resilient means or spring action along with inertial and reactive forces complete the return cycle of the hammer means 8″. Hammer means 8″ comprises ferromagnetic section 76, having a configuration suitably shaped to readily receive the tubing which is to be shirred and compressed, secured to section 78, which may or may not be ferromagnetic, by means of threads 80. Section 78 has recessed slot 82 adapted to receive resilient means or coil spring 84, which spring upon compression is sufficient in size and strength to impart sufficient inertia to the mass to move sections 76 and 78 to the precompression position upon release of the compressive forces. Section 78 is machined to form a close fit with striking-end section 86 so that sections 78 and 86 coact in a piston and cylinder-like manner when spring 84 is compressed. Projection 88 of striking-end section 86 works against coil spring 84 within recess slot 82 tending to maintain maximum displacement of section 86 with respect to section 78. Section 76 is provided with passageway 90 of sufficient diameter to receive head 92 of shaft 10′. Shaft 10′ passes through passageway 93 of section 78 and slidably bears against the interior surfaces of passageway 93 and thenceby passes through passageway 94 of striking-end section 86 and extends into guide 60 where it is supported by a fulcrum means, not shown, which may comprise the corrugated tubing itself or other mechanical equivalents well known in the art. It can be seen that shaft 10′ centrally supports hammer means 8″ within, but out of contact with the interior walls of guide means 2. Projection 96 of striking-end 86 and projection 98 of section 78 have lips 100 which mate and prevent coil spring 84 from separating section 78 and striking-end 86 but which permit movement between sections 86 and 78 within preset limits. The mode of operation of this apparatus is essentially the same as hereinbefore described with the exception that hammer means 8″ is movable with respect to shaft 10′ which remains substantially immobile. In addition only one electric coil 102 is utilized which upon energization by a source of flash current draws sections 76 and 78 into striking-end section 86 compressing spring 84 and moving striking-end section 86 towards orifices or apertures 4 where the tubing is shirred. Upon de-energization of the coil 102, spring 84 returns hammer means 8″ by inertial forces to the starting position for recycle.

The electrical circuitry necessary for the operation of the described apparatus is well known in the art and will not be described in detail inasmuch as specific adaptations will inherently depend on the masses of the components utilized, the operations to be performed and other engineering matters necessary to produce the balance of forces necessitated by the foregoing considerations.

Generally, it is preferred that the source of flash current, provided to the wire windings comprising the coils, be one which provides an exceedingly brief impulse of current. For example, it might use a half cycle of current derived from an oscillatory circuit. In other instances a larger cycle may be necessitated depending upon the operation to be performed and the path length of the inner member, comprising the hammer means, within the outer member comprising the guide means of the various apparatus. Likewise the number of turns of wire comprising the coils and magnitude of the current supplied thereto will be similarly affected.

While the invention has been described in several various embodiments, it is to be noted that similar configurations following the principles as herein set forth will serve equally as well. The sizes of the magnets used in the various embodiments of this invention are matters which are well within the skill of one in the art and will not be discussed at length, it being only important that they be of sufficient size and in proper position to produce the required end results, that is, magnetically suspend the hammer within the guide and/or oscillate the hammer. The hammer may be a solid member or a hollow member, the choice of construction depending upon the modes utilized to suspend and/or oscillate the hammer and the operating characteristics desired. For instance, in the embodiment depicted in FIGURE 1, wherein several sets of electrical windings are utilized to impart oscillating movement, the same end result can be expected when using a hollow hammer member or when employing only two or additional sets of wire windings.

Although specific examples have been confined to the use of a hammer cylindrical in shape, other configurations would suffice equally as well. Ideally, the anterior portion of the hammer should be of smaller diameter than the posterior end to more readily permit the passage of the flexible tubing therearound. The shaft secured to the end of the hammer can be looked upon not only as a support means for the hammer but also as a means to prohibit complete deformation of the flexible tubing by the air jets and also as a means of keeping the corrugations separate and distinct thereby prohibiting interlocking and disruption of the continuity in the corrugations. The hammer means or inner member may also be coated with a material, such as for example plastic, to reduce the amount of friction between the movable components of the apparatus.

While the apparatus has been described as a sausage casing corrugator, it is not to be thusly limited as it is readily apparent that the apparatus can perform other functions such as embossing, imprinting, perforating, cutting, etc. It is readily apparent that the device is well suited for performing two operations in one, i.e., corrugating and compressing flexible tubing wherein the number of punctures or ruptures is drastically reduced. The device is superior to other prior art devices inasmuch as there are essentially no bearing surfaces except that of the plastic tubing and due to the small number of moving parts, the apparatus requires little or no maintenance.

The embodiments of this invention in which an exclusive property or privilege is claimed are defined as follows:

1. An apparatus for simultaneously corrugating and compressing a continuous length of flexible tubing, which comprises:
   a housing of non-magnetic material defining a central elongated chamber;
   means for injecting a gas under pressure into said chamber, said gas being injected about the periphery of said chamber at a point intermediate its length;
   a piston slidably disposed within a section of said chamber anterior to said gas injection means;
   means to magnetically suspend said piston concentrically within said chamber so as to form an annular opening between the interior of said housing and said piston sufficient to permit passage of the tubing around said piston; and
   means to reciprocate said piston within said chamber from an advanced position proximate said gas injection means to a withdrawn position rearward thereof;
   whereby, with the piston in the rearward position, the tubing passing through said chamber is inwardly distended by the external pressure of the gas entering into said chamber, and wherein the piston in moving from a rearward to an advanced position simultaneously (1) longitudinally compresses the inwardly distended section of the tubing to form a radial corrugation in the tubing, (2) forces the compressed corrugated tubing into the section of the chamber posterior to said gas injection means, and (3) advances the tubing into said chamber.

2. The apparatus defined in claim 1 wherein said section of said chamber posterior to said gas injection means is of slightly smaller cross-section so as to frictionally engage the corrugated tubing.

3. The apparatus defined in claim 1 including guide means engaging said piston and extending into the section of said chamber posterior to said gas injection means.

4. An apparatus for simultaneously corrugating and compressing a continuous length of flexible tubing, which comprises:
   a first non-magnetic cylindrical conduit;
   a second non-magnetic cylindrical conduit of slightly smaller inside diameter axially aligned with said first conduit;
   means for injecting a gas under pressure around the periphery of said first conduit at a point adjacent its juncture with said second conduit;
   a cylindrical piston slidably disposed within said first conduit;
   guide means engaging said piston and extending into said second conduit;
   means to magnetically suspend said piston concentrically within said first conduit so as to form an annular opening between the interior of said conduit and said piston sufficient to permit passage of the tubing around said piston; and
   means to reciprocate said piston within said chamber from an advanced position proximate said gas injection means to a withdrawn position rearward thereof;
   whereby, with the piston in the rearward position, the tubing passing through said first conduit is inwardly distended by the external pressure of the gas, and wherein the piston in moving from a rearward to an advanced position simultaneously (1) longitudinally compresses the inwardly distended section of the tubing to form a radial corrugation in the tubing, (2) forces the compressed corrugated tubing into said second conduit, and (3) advances the tubing into said first conduit.

5. The apparatus defined in claim 4 wherein said gas injection means comprises a hollow annular ring having a cylindrical interior face of essentially the same inside diameter as said first conduit, a gas supply connection and a plurality of circumferentially aligned apertures about the periphery of said interior face.

6. The apparatus defined in claim 4 wherein said guide means comprises a cylindrical member of reduced diameter slidably engaging said piston so that said piston can be reciprocated without imparting similar motion to said member.

7. The apparatus defined in claim 4 wherein said guide means comprises a cylindrical member of reduced diameter fixedly attached to said piston and reciprocating therewith.

8. The apparatus defined in claim 4 including means juxtaposed posterior to said gas injection means to retrict the free passage of the tubing into said second conduit.

9. The apparatus in accordance with claim 4 wherein said piston is comprised of a ferromagnetic material, wherein said means to magnetically suspend said piston concentrically within said chamber comprises a first electrical solenoid coil circumferentially disposed about the exterior of said first conduit intermediate the stroke of said piston and means to electrically energize said coil, and wherein said means to reciprocate said piston comprises second and third electrical solenoid coils longitudinally disposed on either side of said first coil coextensive with said piston and means to alternately electrically energize said second and third coils for intermittent periods.

10. The apparatus defined in claim 4 wherein said piston is comprised of a ferromagnetic member integrally disposed between longitudinally adjacent non-magnetic members, and wherein said means for magnetically suspending said piston concentrically within said chamber comprises first annular permanent magnets mounted with opposed polarity at either end of said piston and second annular permanent magnets concentrically circumscribing said chamber juxtaposed to said first magnets, said juxtaposed magnets being of opposed polarity.

11. The apparatus defined in claim 10 wherein said means for reciprocating said piston comprises a pair of electrical solenoid coils circumferentially disposed about the exterior of said housing in spaced relationship and means to alternately electrically energize said coils for intermittent periods.

12. The apparatus defined in claim 10 wherein a bearing surface is provided on the exterior of said housing and wherein said means to reciprocate said piston comprises a permanent magnet slidably disposed on the exterior of said housing and means to reciprocate said magnet.

13. An apparatus for simultaneously corrugating and compressing a continuous length of flexible tubing, which comprises:
a first non-magnetic cylindrical conduit;
a second non-magnetic cylindrical conduit of slightly reduced inside diameter axially aligned with said first conduit;
means for injecting a gas under pressure around the periphery of said first conduit at a point adjacent its juncture with said second conduit;
a stationary shaft coaxially positioned within said second conduit and extending into said first conduit;
a piston at least partially comprised of ferromagnetic material slidably disposed within said first conduit and concentrically supported therewithin on said stationary shaft so as to form an annular opening between the interior of said conduit and said piston sufficient to permit passage of the tubing around said piston;
an electrical solenoid coil disposed on the exterior of said first conduit so as to produce an electromagnetic force when electrically energized sufficient to longitudinally displace said piston to an advanced position proximate said gas injection means; and
biasing means to return said piston to a rearward position when said electrical solenoid coil is deenergized.

References Cited
UNITED STATES PATENTS

| | | | |
|---|---|---|---|
| 967,245 | 8/1910 | Rountree | 91—459 |
| 2,324,645 | 7/1943 | Prehler | 18—19 |
| 2,627,183 | 2/1953 | Greenwood et al. | |
| 2,922,971 | 1/1960 | Jeglum. | |
| 3,050,943 | 8/1962 | Thorel et al. | 91—459 |
| 3,076,228 | 5/1963 | Johnson | 18—19 |
| 3,162,249 | 12/1964 | Kininpress et al. | 91—459 X |
| 3,194,041 | 7/1965 | Johnson | 18—19 |

WILLIAM J. STEPHENSON, *Primary Examiner.*